（12） United States Patent
Kumai

(10) Patent No.: US 8,471,984 B2
(45) Date of Patent: *Jun. 25, 2013

(54) POLARIZING ELEMENT, METHOD FOR PRODUCING SAME, LIQUID CRYSTAL DEVICE, ELECTRONIC APPARATUS, AND PROJECTION DISPLAY

(75) Inventor: Yoshitomo Kumai, Okaya (JP)

(73) Assignee: Seiko Epson Corporation (JP)

( * ) Notice: Subject to any disclaimer, the term of this patent is extended or adjusted under 35 U.S.C. 154(b) by 835 days.

This patent is subject to a terminal disclaimer.

(21) Appl. No.: 12/630,253

(22) Filed: Dec. 3, 2009

(65) Prior Publication Data

US 2010/0149441 A1     Jun. 17, 2010

(30) Foreign Application Priority Data

Dec. 17, 2008    (JP) ................................. 2008-320950

(51) Int. Cl.
*G02F 1/13*     (2006.01)
*G02F 1/1335*   (2006.01)

(52) U.S. Cl.
USPC .................................. 349/96; 349/5; 349/99

(58) Field of Classification Search
USPC ................................. 349/5, 96, 99
See application file for complete search history.

(56) References Cited

U.S. PATENT DOCUMENTS

| 5,639,563 | A | 6/1997 | Ohnuki et al. |
| 7,113,338 | B2 | 9/2006 | Kunisada et al. |
| 2007/0152358 | A1* | 7/2007 | Suganuma .................... 264/1.31 |
| 2008/0252825 | A1* | 10/2008 | Kim et al. ........................ 349/96 |
| 2009/0066885 | A1* | 3/2009 | Kumai ............................ 349/96 |
| 2010/0149441 | A1 | 6/2010 | Kumai |

FOREIGN PATENT DOCUMENTS

| JP | 2005-181990 | 7/2005 |
| JP | 2005-242379 | 9/2005 |
| JP | 2007-148344 | 6/2007 |
| JP | 2007-171802 | 7/2007 |
| JP | 2007-178763 | 7/2007 |
| JP | 2009-069382 | 4/2009 |

* cited by examiner

*Primary Examiner* — Huyen Ngo

(74) *Attorney, Agent, or Firm* — Harness, Dickey & Pierce, P.L.C.

(57) ABSTRACT

A polarizing element includes a substrate; a plurality of protruded threads formed on one of surfaces of the substrate in a rough stripe pattern when viewed two-dimensionally, each of the protruded threads having a side surface forming a slope inclined with respect to the one surface of the substrate; and a plurality of metal thin wires each formed on the slope of the each protruded thread so as to be cantilever-supported by the slope and each extended in an extension direction of the protruded thread.

9 Claims, 6 Drawing Sheets

POLARIZING ELEMENT, METHOD FOR PRODUCING SAME, LIQUID CRYSTAL DEVICE, ELECTRONIC APPARATUS, AND PROJECTION DISPLAY

CROSS-REFERENCE TO RELATED APPLICATION

This application is based on and claims priority from Japanese Patent Application No. 2008-320950, filed on Dec. 17, 2008, the contents of which are incorporated herein by reference.

BACKGROUND

1. Technical Field

The present invention relates to a polarizing element, a method for producing the polarizing element, a liquid crystal device, an electronic apparatus, and a projection display.

2. Related Art

A variety of electro-optical apparatuses use a liquid crystal device as a light modulation device. In widely known liquid crystal devices, a liquid crystal layer is provided between a pair of substrates opposing each other. Additionally, it is common for such a liquid crystal device to include a polarizing element inputting a predetermined polarized light to the liquid crystal layer and an alignment film controlling alignment of liquid crystal molecules when no voltage is applied.

Among known polarizing elements, there are a thin-film polarizing element and a wire-grid polarizing element. The thin-film polarizing element is produced by extending a film made of resin containing iodine or a dichroic dye in a single direction to allow molecules of iodine or the dichroic dye to be aligned in the extension direction. The wire-grid polarizing element is formed by densely laying nano-scale metal thin wires on a substrate made of a transparent material.

The wire-grid polarizing element is made of an inorganic material. Thus, due to its excellent thermal resistance, the wire-grid polarizing element is suitably used particularly as a thermally-resistant constituent member, such as a polarizing element for a light valve of a liquid crystal projector. JP-A-2007-148344 discloses a technological example of the wire-grid polarizing element thus characterized.

Optical characteristics of the polarizing element are influenced by a refractive index of a material provided around the metal thin wires, so that a material with a refractive index of 1 seems to be desirable. In other words, it is desirable to place the metal thin wires in an air (or a vacuum). On the other hand, the metal thin wires are not self-supporting and, in general, are formed on a transparent substrate or the like. In this case, however, a refractive index of the transparent substrate seems to have an influence that reduces properties of the polarizing element, as compared to those in an ideal condition.

SUMMARY

An advantage of the invention is to provide a wire-grid polarizing element that minimizes reduction of optical characteristics, and another advantage of the invention is to provide a method for producing the polarizing element. In addition, still other advantages of the invention are to provide a liquid crystal device, an electronic apparatus, and a projection display, each of which includes the polarizing element and thereby exhibits high display quality and high reliability.

In order to solve the above problems, a polarizing element according to a first aspect of the invention includes: a substrate; a plurality of protruded threads formed on one of surfaces of the substrate in a rough stripe pattern when viewed two-dimensionally, each of the protruded threads having a side surface forming a slope inclined with respect to the one surface of the substrate; and a plurality of metal thin wires each formed on the slope of the each protruded thread so as to be cantilever-supported by the slope and each extended in an extension direction of the protruded thread.

In the above structure, a part of the metal thin wire not in contact with the protruded thread but contacts with an air substantially having a refractive index of 1, thereby obtaining a polarizing element having good optical properties.

Preferably, in the polarizing element of the aspect, an upper end surface of the protruded thread is roughly flat, and the each metal thin wire is protruded from the slope toward the upper end surface of the protruded thread in a manner so as to cover at least a part of the upper end surface when viewed two-dimensionally.

In the above structure, a width of the metal thin wires can be set with higher design flexibility.

Preferably, in the polarizing element of the aspect, the metal thin wires are made of a metal selected among silicon, germanium, and molybdenum.

Since the above-mentioned materials are not oxidized, the polarizing element does not deteriorate and thus can be highly reliable. Particularly, in a polarizing element used for an application purpose under a high temperature condition, oxidization reaction is promoted under the high temperature environment. However, the polarizing element including the metal thin wires made of any one of the above metals can be highly durable.

A method for producing a polarizing element according to a second aspect of the invention, the polarizing element includes a plurality of protruded threads formed on one of surfaces of a substrate in a rough stripe pattern when viewed two-dimensionally and a mask formed on an upper portion of each of the protruded threads. The method includes forming a plurality of metal thin wires each extended along the each protruded thread, each of the metal thin wires being made of a metal material deposited both on one of side surfaces of the protruded thread and on one side surface of the mask adjacent to the one side surface of the protruded thread; and removing the mask.

In the method above, when forming the metal thin wires, the presence of the mask can prevent the metal material from being deposited on an unnecessary part. In addition, since the metal material is deposited both on the protruded thread and on the mask, there can be obtained a wide area for deposition, whereby a sufficient amount of the metal material can be deposited. Consequently, the polarizing element can have excellent optical characteristics and can be produced easily.

Preferably, in the method of the second aspect, the one side surface of the mask is a slope that covers at least a part of the upper portion of the each protruded thread when viewed two-dimensionally.

In the method above, the metal thin wire formed on the one side surface of the mask results in two-dimensionally overlapping with the upper portion of the each protruded thread. In short, the metal thin wires covering the upper portions of the protruded threads can be easily formed, so that the width of the metal thin wires can be easily controlled.

Preferably, in the method of the second aspect, before the metal thin wire formation step, the protruded thread formation step forms a resist having a predetermined pattern on one of surfaces of a base member forming the substrate and etches the base member via the resist to obtain the substrate having the protruded threads formed in the predetermined pattern, and the mask formation step forms the mask by using a part of the resist left on the upper portion of each of the protruded threads.

In the method above, the mask can be formed simultaneously with formation of the protruded threads. This can simplify a process of producing the polarizing element and can easily form the resist mask matching a shape of the protruded threads.

A projection display according to a third aspect of the invention includes an illumination optical system that outputs light, a liquid crystal light valve that modulates the light, the polarizing element of the first aspect that receives the light modulated by the liquid crystal light valve, and a projection optical system that projects polarized light transmitted through the polarizing element on a projected surface.

In the structure above, the projection display includes the polarizing element having high thermal resistance, which can suppress heat-induced deterioration of the polarizing element and oxidization-induced deterioration promoted by heating even when a high power light source is used. Therefore, the obtained projection display can be highly reliable and can have excellent display characteristics.

A liquid crystal device according to a fourth aspect of the invention includes a pair of substrates, a liquid crystal layer provided between the substrates, and the polarizing element of the first aspect formed on a surface of at least one of the substrates, the surface facing the liquid crystal layer.

In the structure above, the liquid crystal device of the fourth aspect includes the polarizing element having excellent optical characteristics.

An electronic apparatus according to a fifth aspect of the invention includes the liquid crystal device of the fourth aspect.

In the structure above, the electronic apparatus of the fifth aspect includes a display section and a light modulation unit having high display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described.

First Embodiment

Figure 1A:
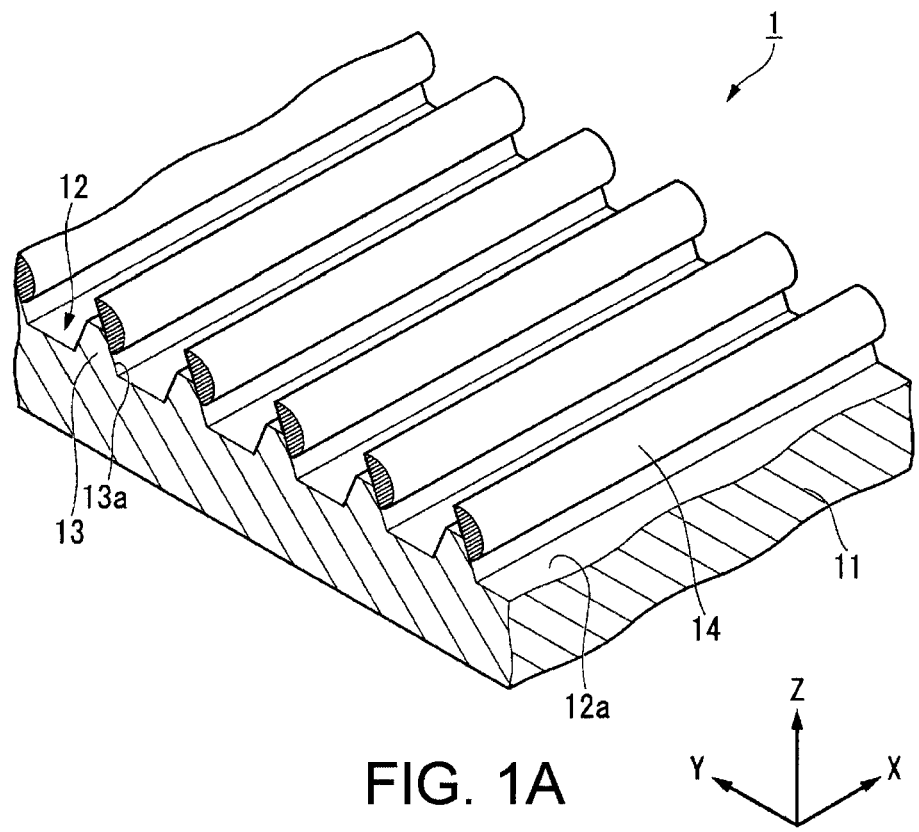
FIGS. 1A and 1B are schematic views showing a polarizing element according to an embodiment of the invention.
Figure 1B:
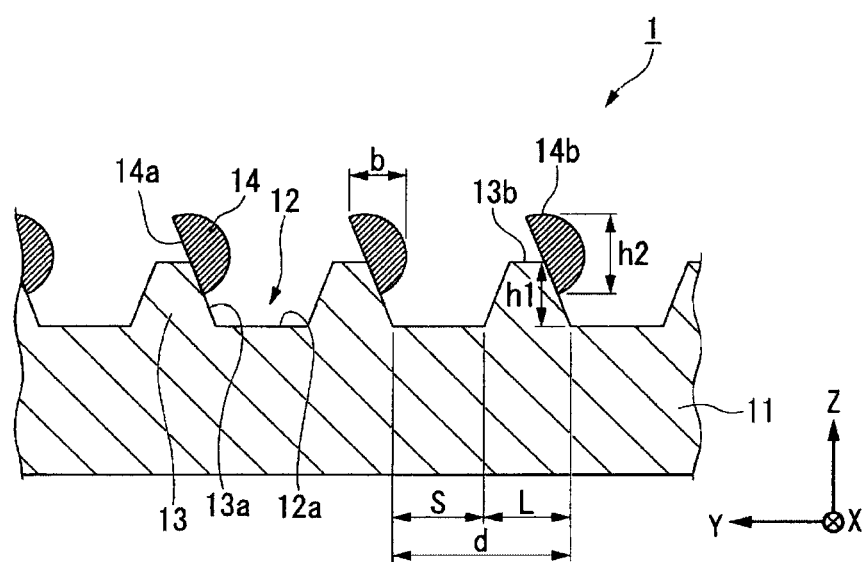

Hereinafter, descriptions will be given of a polarizing element according to a first embodiment of the invention and a method for producing the polarizing element of the first embodiment by referring to the drawings. FIGS. 1A and 1B are schematic views showing a polarizing element 1 of the first embodiment. FIG. 1A is a fragmentary perspective view of the polarizing element 1, and FIG. 1B is a fragmentary sectional view taken along a Y-Z plane of the polarizing element 1.

In the descriptions below, an XYZ coordinate system will be set, and based on the XYZ coordinate system, positional relationships between constituent members will be explained. In this case, a predetermined direction within a horizontal plane is referred to as an X-axis direction; a direction orthogonal to the X-axis direction within the horizontal plane is referred to as a Y-axis direction; and a direction orthogonal to each of the X-axis direction and the Y-axis direction is referred to as a Z-axis direction. In the present embodiment, an extension direction of metal thin wires corresponds to the X-axis direction, and an arrangement direction of the metal thin wires corresponds to the Y-axis direction. In addition, in all of the drawings referred to below, film thicknesses of constituent elements, a size ratio among the elements, and the like are changed according to needs.

Polarizing Element

As shown in FIG. 1A, the polarizing element 1 includes a substrate 11 and a plurality of metal thin wires 14 extended in a single direction on the substrate 11.

The substrate 11 is made of a transparent material, such as glass, quartz, or plastic. Depending on application purposes of the polarizing element 1, heat storage occurs in the polarizing element 1, thereby causing a temperature increase in the polarizing element 1. Accordingly, preferably, the substrate 11 is made of a highly thermal resistant material, such as glass or quartz.

On a surface of the substrate 11 are formed a plurality of grooved portions 12 extended in the X-axis direction. A portion between adjacent ones of the grooved portions 12 corresponds to each of a plurality of protruded threads 13 extended in the X-axis direction. The grooved portions 12 are formed at equal intervals in the Y-axis direction in a cycle shorter than a wavelength of visible light, and the protruded threads 13 are also formed in the same cycle as the above cycle.

Each of the metal thin wires 14 is provided on a side surface (a slope) 13a of each protruded thread 13 to be formed in a manner extended in the X-axis direction, which is same as the extension direction of the protruded thread 13. The metal thin wire 14 transmits linearly polarized light vibrating in a direction orthogonal to the extension direction of the metal thin wire 14 (namely, in the Y-axis direction) and reflects linearly polarized light vibrating in the extension direction thereof 14 (namely, in the X-axis direction). The metal thin wire 14 is made of a metal such as aluminum.

As shown in FIG. 1B, the side surface 13a of the protruded thread 13 is formed so as to be inclined in a tapered manner in a direction receding from a bottom surface 12a of each grooved portion 12. A top surface 13b of the protruded thread 13 is a flat surface approximately parallel to the bottom surface 12a of the grooved portion 12. Regarding sizes of the grooved portion 12 and the protruded thread 13, for example, a height h1 and a width L, respectively, of the protruded thread 13 are 100 nm and 70 nm, respectively, and a width S of the bottom surface 12a is 70 nm, and a cycle (a pitch) d including the grooved portion 12 and the protruded thread 13 is 140 nm.

In the metal thin wire 14, a part of an opposing surface 14a opposing the protruded thread 13 is provided on the side surface 13a of the protruded thread 13, whereas a remaining part of the opposing surface 14a is distant from the protruded thread 13. Additionally, an upper end of the metal thin wire 14 (an end thereof in the Z-axis direction) 14b is formed up to above the top surface 13b. The part of the opposing surface 14a not in contact with the side surface 13a two-dimensionally overlaps with the top surface 13b.

A width of the metal thin wire 14 is closely related to performance of the polarizing element 1. If the width of the metal thin wire 14 is controlled by a width in a +Y-axis direction from the side surface 13a, the width of the metal thin wire 14 can be increased only by the width of the grooved portion 12 at maximum. However, in the embodiment, since the metal thin wire 14 is formed so as to cover the top surface 13b, the width of the metal thin wire 14 can be set more flexibly. For example, the metal thin wire 14 may have a width b of 30 nm and a height h2 of 30 nm.

Figure 2A:
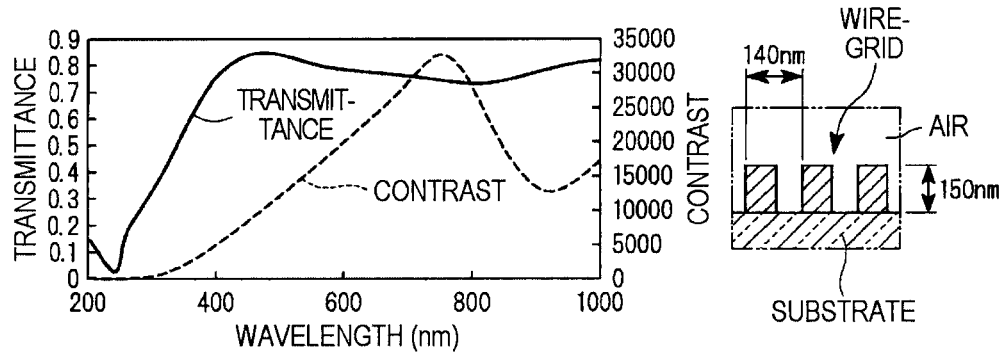
FIGS. 2A and 2B are graphs and schematic structural views illustrating optical characteristic changes in polarizing elements having structural differences.
Figure 2B:
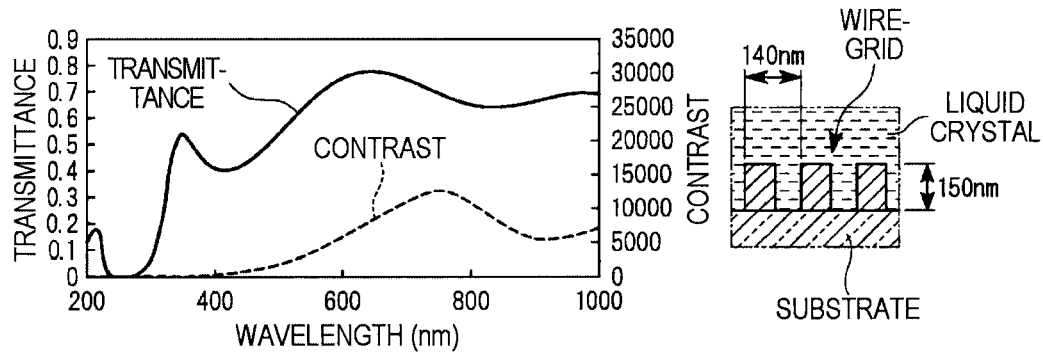

In general, optical characteristics of a polarizing element are influenced by a refractive index of a material arranged around metal thin wires and a desirable refractive index seems to be 1. FIGS. 2A and 2B are illustrations showing optical characteristic changes due to the refractive index of a material arranged around metal thin wires included in respective wire-grid polarizing elements.

FIG. 2A is a graph and a schematic structural view showing optical characteristics (transmittance and contrast) of a wire-grid polarizing element in an air (the refractive index of 1). In addition, FIG. 2B is a graph and a schematic structural view showing optical characteristics of a wire-grid polarizing element in which liquid crystal (a refractive index of 1.6) is filled around metal thin wires.

The graphs shown in FIGS. 2A and 2B each indicate a calculation result of a transmittance Tp obtained when inputting linearly polarized light having a vibration direction parallel to a transmission axis of the polarizing element in each of the mentioned-above conditions (a vibration direction vertical to the extension direction of the metal thin wire) and a calculation result of a contrast (Tp/Ts) obtained as a ratio between the transmittance Tp and a transmittance Ts of linearly polarized light in a vibration direction parallel to a reflection axis of the polarizing element.

As shown in FIG. 2A, it is found that the polarizing element with the metal thin wires placed in the air exhibits good characteristics in a visible light region. In contrast, in the condition of FIG. 2B where the liquid crystal is filled in an opening portion between the metal thin wires, a uniformity of transmittance is reduced in the visible light region, and particularly, there is a significant drop in a region of blue color (a region near a wavelength of 440 nm). This indicates that the optical characteristics are reduced when a material having a refractive index higher than 1 is arranged around the metal thin wires.

In the polarizing element 1 of the first embodiment, the metal thin wires 14 contact with the air substantially having the refractive index of 1 on the opposing surface 14a. Accordingly, good optical characteristics can be obtained.

Method for Producing Polarizing Element

FIGS. 3A to 3E are illustrations of steps for producing the polarizing element 1. Each of the illustrations corresponds to the sectional view of FIG. 1B.

Figure 3A:
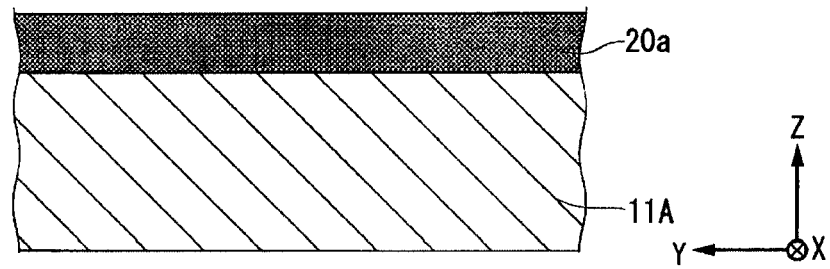
FIGS. 3A to 3E are sectional views illustrating steps for producing the polarizing element of the embodiment.

First, as shown in FIG. 3A, there is prepared a substrate member (a base member) 11A, such as a glass substrate. Then, a resist material is applied on one of surfaces of the base member 11A by spin coating and then pre-baked to form a resist layer 20a. For example, the resist material may be a chemical amplification type positive photoresist: TDUR-P338EM (manufactured by Tokyo Ohka Kogyo Co., Ltd.). In the embodiment, the resist layer 20a has a width of 200 nm.

Figure 3B:
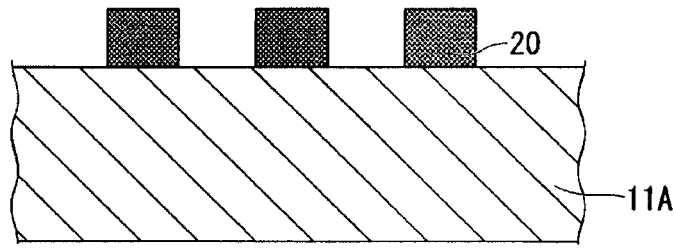

Next, as shown in FIG. 3B, for example, the resist layer 20a is exposed by a two-beam interference exposure system using a laser beam having a wavelength of 266 nm as an exposure light beam and then baked (post-exposure baking: PEB) to be developed. Thereby, there is formed a resist layer 20 having a striped pattern. The resist layer 20 of the embodiment has a height of 200 nm.

Figure 4:
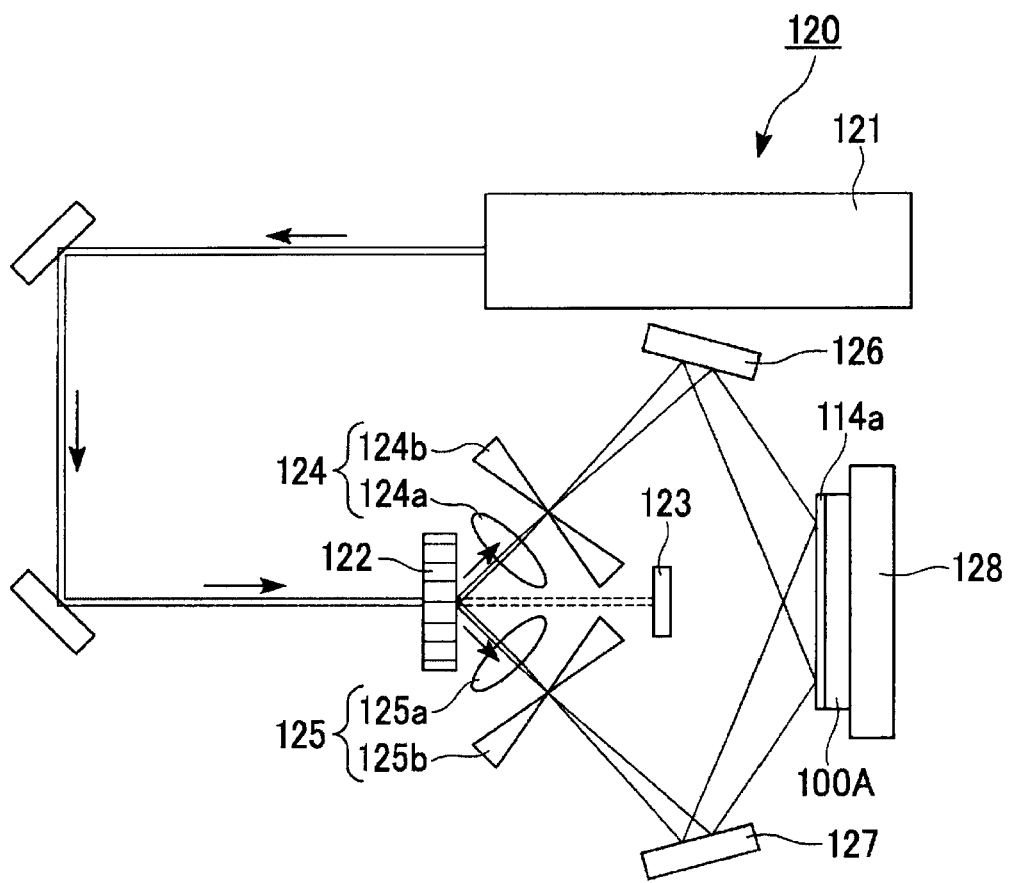
FIG. 4 is a schematic structural view showing an example of an exposure apparatus used to produce the polarizing element of the embodiment.

In this case, for example, an exposure apparatus used to perform the two-beam interference exposure system may be an exposure apparatus as shown in FIG. 4. An exposure apparatus 120 includes a laser light source 121 applying an exposure light beam, a diffraction beam splitter 122, a monitor 123, beam expanders 124 and 125, mirrors 126 and 127, and a stage 128 where the substrate 11 is to be mounted.

The laser light source 121 may be an Nd:YVO4 laser apparatus having a fourth-order harmonic wavelength of 266 nm, for example. The diffraction beam splitter 122 is a splitting unit generating two laser beams by splitting a single laser beam output from the laser light source 121. The diffraction beam splitter 122 is structured to generate two diffracted beams (±first order) having an equal intensity when an incident laser beam is TE polarized light. The monitor 123 receives light emitted from the diffraction beam splitter 122 to convert the received light into an electric signal. Based on the converted electric signal, the exposure apparatus 120 can adjust an intersection angle of the two laser beams and the like.

The beam expander 124 includes a lens 124a and a space filter 124b and expands a beam diameter of one of the two laser beams split by the diffraction beam splitter 122 to approximately 200 mm, for example. Similarly, the beam expander 125 also includes a lens 125a and a space filter 125b and expands a beam diameter of the other one of the two laser beams.

The mirrors 126 and 127, respectively, reflect a laser beam transmitted though the beam expanders 124 and 125, respectively, toward the stage 128. The mirrors 126 and 127 generate interference light by intersecting the laser beams to apply the interference light to the resist layer 20a on the substrate 11.

In this manner, the resist layer 20a can be exposed at a formation pitch narrower than the wavelength of the laser light source 121 by the exposure apparatus 120 applying the interference light onto the resist layer 20a.

Figure 3C:
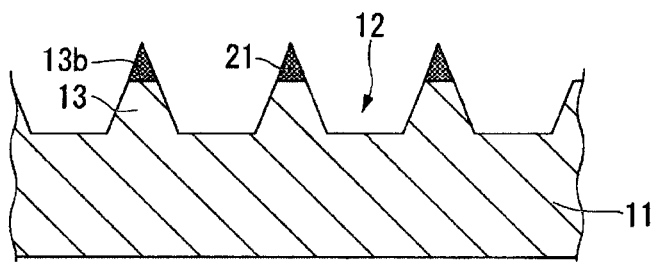

Next, as shown in FIG. 3C, by performing dry etching via the resist 20, the substrate material 11A is etched down by approximately 50 to 100 nanometers to perform a patterning of the substrate material 11A so as to form the substrate 11 having the grooved portions 12 and the protruded threads 13. In the present embodiment, the etching is performed to remove approximately 100 nanometers for the grooved portions 12. Additionally, in the dry etching, the resist 20 formed on the substrate material 11A is also etched, whereby a remaining resist 21 used as a mask in a later step remains on the top surface 13b of the protruded thread 13.

As an etching gas in the embodiment, a mixture gas is used that contains $C_2F_6$, $CF_4$, and $CHF_3$. As reaction conditions in etching, for example, a gas flow rate of $C_2F_6$:$CF_4$:$CHF_3$ is 20:30:30 sccm, discharge power is 300 W, pressure is 5 Pa, and reaction time ranges from 30 to 40 sec.

Figure 3D:
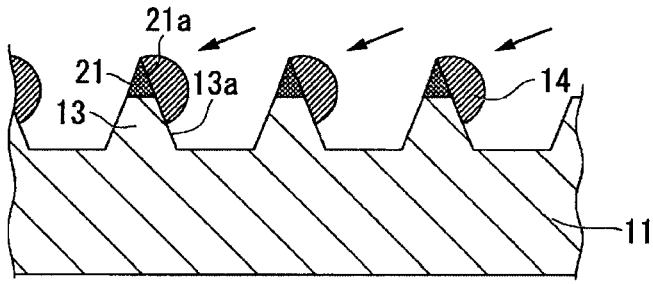

Next, as shown in FIG. 3D, a known magnetron sputtering apparatus is used to form the metal thin wires 14 in such a manner that each of the metal thin wires 14 straddles the side surface 31a of the protruded thread 13 and a side surface 21a of the remaining resist 21. In the drawing, each of arrows indicates a flying direction of sputtered particles. Due to the presence of the remaining resist 21, deposition of a metal film on an unnecessary portion can be prevented, as well as the sputtered particles can be deposited both on the side surfaces 13a and 21a. Thus, the metal thin wires 14 can be formed so as to have a large bottom area and a large volume.

The metal thin wires 14 are formed on an entire part of at least a region where the polarizing element is formed on the substrate 11. In order to form the metal thin wires 14, there may be used any of known oblique deposition methods, such as ion beam sputtering, other than magnetron sputtering. As reaction conditions in the embodiment, a gas flow rate of Ar is 10 sccm, discharge power is 1000 W, pressure is 0.1 Pa, and reaction time ranges from 2 to 4 min.

In the embodiment, the metal thin wires 14 are made of aluminum. However, other than aluminum, silicon, germanium, or molybdenum may be suitable. When aluminum is used for the metal thin wires 14, deterioration may occur because aluminum is an easily oxidized metal although processing of aluminum is easy. Accordingly, among the metal materials mentioned above, any one of silicon, germanium, and molybdenum that are not oxidized is preferably used, since those materials can prevent deterioration of the metal thin wires 14.

For example, when the polarizing element is used for a purpose in a high temperature state, an oxidization reaction is accelerated under the high temperature environment. However, when the metal thin wires 14 are made of any of the above materials, the polarizing element can have a high thermal resistance. In addition, according to needs, an alloy mainly containing those materials may be used for the material of the metal thin wires 14.

Figure 3E:
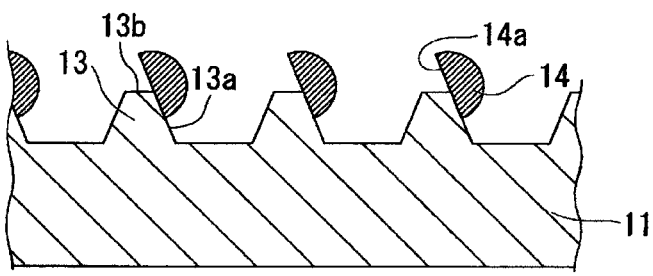

Next, as shown in FIG. 3E, ashing is performed to remove the remaining resist 21 remaining on the top surface 13b of the protruded thread 13. The removal of the remaining resist 21 exposes a part of the opposing surface 14a in contact with the side surface of the remaining resist 21 in the each metal thin wire 14, whereby the metal thin wire 14 contacts only with the side surface 13a of the protruded thread 13. As reaction conditions, a gas flow rate of $O_2$ is 50 sccm, pressure is 10 Pa, reaction time is 30 sec, and ICP/Bias power is 60/30 W. In this manner, the polarizing element 1 of the embodiment can be completed.

In the polarizing element 1 thus formed, the part of the opposing surface 14a not in contact with the protruded thread 13 but contacts with the air having substantially the refractive index of 1, thereby allowing the polarizing element 1 to have good optical properties.

In the method for producing the polarizing element 1 thus formed, when forming the metal thin wires 14, the presence of the remaining resist 21 can prevent deposition of a metal material on an unnecessary portion. Additionally, since the metal material is deposited both on the protruded thread 13 and on the remaining resist 21, there can be obtained a wide deposition area, thereby obtaining a sufficient amount of deposition. As a result, the polarizing element 1 having excellent optical characteristics can be easily produced.

Projection Display

Figure 5:
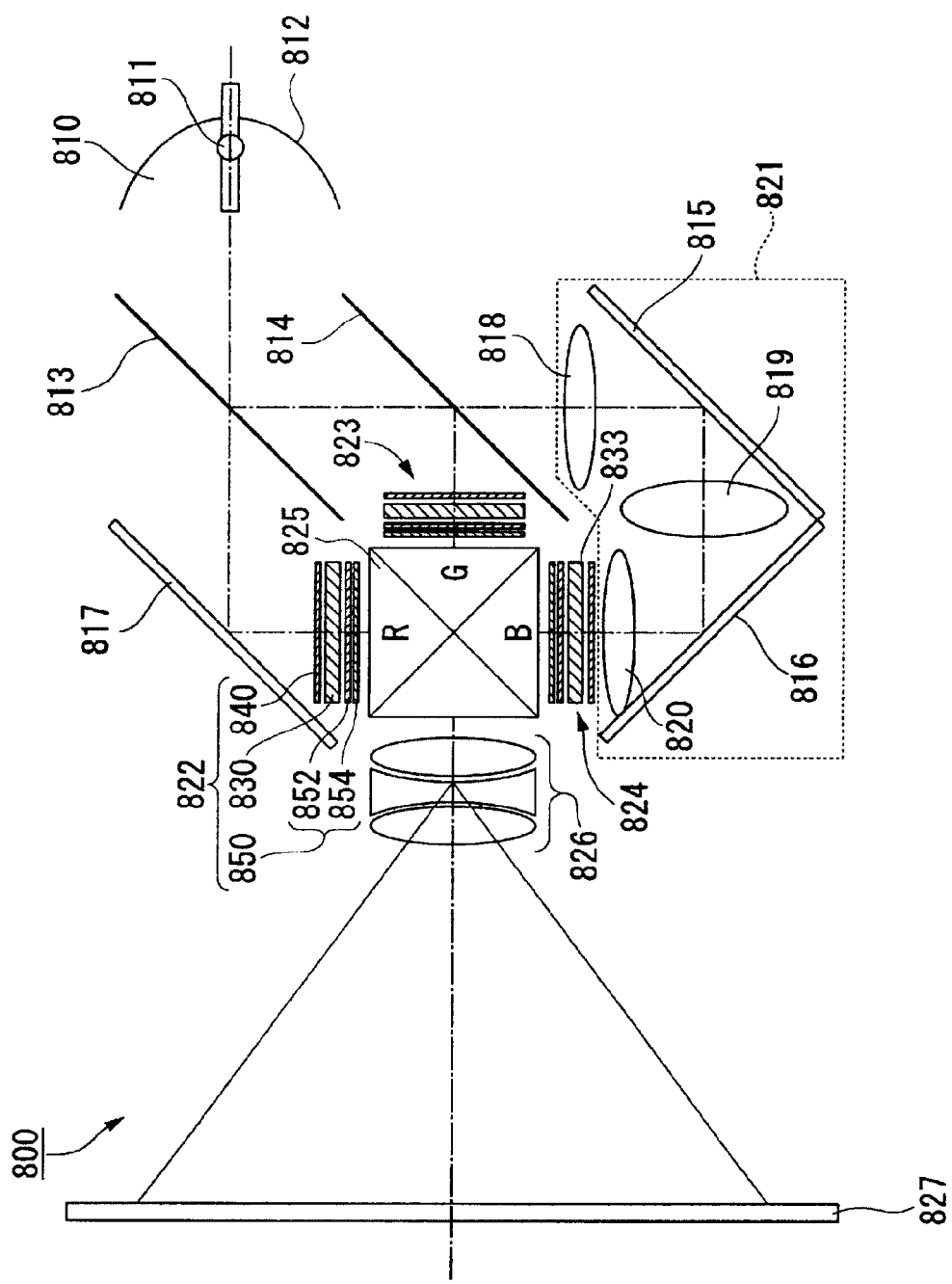
FIG. 5 is a schematic structural view of a projector as an electronic apparatus according to an embodiment of the invention.

Next, a description will be given of an electronic apparatus according to an embodiment of the invention. A projector (a projection display) 800 shown in FIG. 5 includes a light source (an illumination optical system) 810, dichroic mirrors 813 and 814, reflecting mirrors 815, 816, and 817, an incident lens 818, a relay lens 819, an output lens 820, light modulation sections 822, 823, and 824, a cross dichroic prism 825, and a projection lens (a projection optical system) 826.

The light source 810 includes a lamp 811 such as a metal halide lamp, and a reflector 812 reflecting light of the lamp. As the light source 810, besides the metal halide lamp, there may be mentioned an ultra-high pressure mercury lamp, a flash mercury lamp, a high pressure mercury lamp, a deep UV lamp, a xenon lamp, a xenon flash lamp, or the like.

The dichroic mirror 813 transmits red light included in white light from the light source 810 and reflects blue light and green light. The transmitted red light is reflected by the reflecting mirror 817 to be input to the light modulation section 822 for red light. Of the blue light and the green light reflected by the dichroic mirror 813, the green light is reflected by the dichroic mirror 814 and input to the light modulation section 823 for green light. The blue light is transmitted through the dichroic mirror 814 and input to the light modulation section 824 for blue light via a relay optical system 821 including the incident lens 818, the relay lens 819, and the output lens 820 provided to prevent optical loss due to a long optical path.

In each of the light modulation sections 822 to 824, on opposite sides of a liquid crystal light valve 830 are arranged an input polarizing element 840 and an output polarizing element section 850 so as to sandwich the light valve 830 therebetween. The input polarizing element 840 and the output polarizing element section 850 are positioned such that transmission axes of the polarizing element 840 and the polarizing element section 850 intersect with each other (a cross nicol arrangement).

The input polarizing element 840 is a reflecting polarizing element that reflects light of a vibration direction orthogonal to the transmission axis.

The output polarizing element section 850 includes a first polarizing element (a pre-polarization plate or a pre-polarizer) 852 and a second polarizing element 854. The first polarizing element 852 corresponds to the above-described polarizing element according to the embodiment of the invention. The second polarizing element 854 is a polarizing element made of an organic material. In the output polarizing element section 850, the polarizing elements 852 and 854 are both a light-absorbing polarizing element and work together to absorb light.

In general, such a light-absorbing polarizing element made of an organic material tends to deteriorate due to heat and thus cannot be used as a polarization unit for a large power projector requiring a high level of luminance. However, in the projector 800 of the embodiment, the first polarizing element 852 made of an inorganic material having high thermal resistance is arranged between the second polarizing element 854 and the liquid crystal light valve 830, and the polarizing elements 852 and 854 cooperate to absorb light. Thereby, deterioration of the second polarizing element 854 made of an organic material is suppressed.

The three color light beams modulated by the respective light modulation sections 822 to 824 are input to the cross dichroic prism 825. The cross dichroic prism 825 is formed by adhering together four square prisms. On interfaces of the square prisms are formed a dielectric multilayer reflecting red light and a dielectric multilayer reflecting blue light in an X-letter shape. The three color light beams are synthesized by the dielectric multilayers to generate light representing color images. The synthesized light is projected on a screen 827 by the projection lens 826, whereby color images are enlarged to be displayed.

In the projector 800 thus formed, the output polarizing element section 850 includes the polarizing element of the embodiment described above, so that deterioration of the polarizing element can be suppressed even when using a high power light source. Accordingly, the projector 800 can be highly reliable and can have excellent display characteristics.

Liquid Crystal Device

Figure 6:
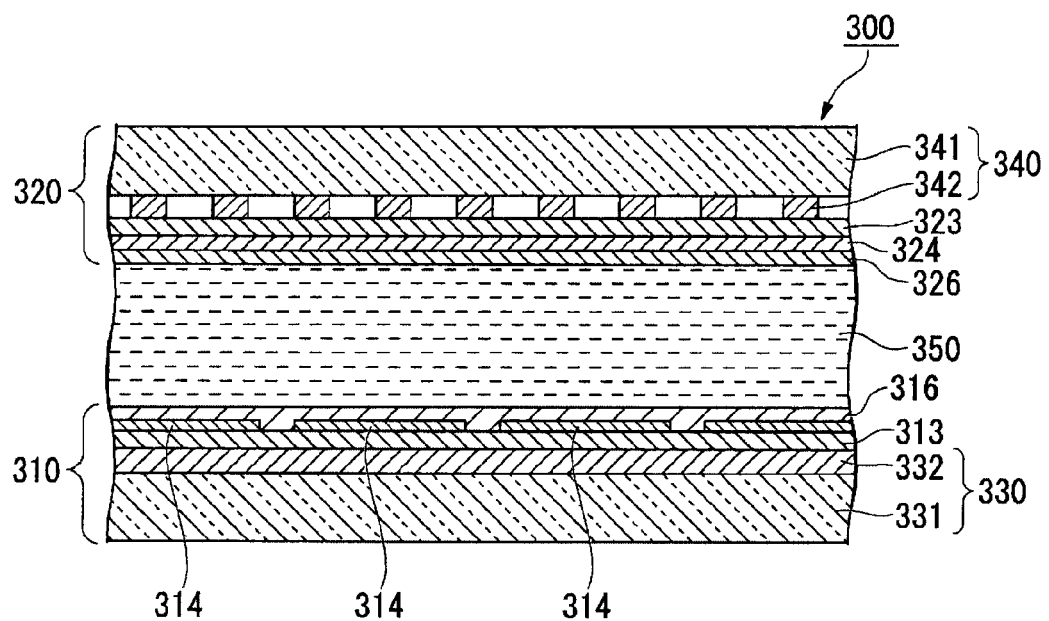
FIG. 6 is a schematic structural view showing an example of a liquid crystal device according to an embodiment of the invention, the device including the polarizing element of the embodiment.

FIG. 6 is a schematic sectional view showing an example of a liquid crystal device 300 according to an embodiment of the invention. The liquid crystal 300 includes the polarizing element of the embodiment. The liquid crystal device 300 of the embodiment is formed by providing a liquid crystal layer 350 between an element substrate 310 and an opposing substrate 320.

The element substrate 310 and the opposing substrate 320, respectively, include polarizing elements 330 and 340, respectively. The polarizing elements 330 and 340 are both the polarizing element of the described-above polarizing element of the embodiment and have a structure in which metal thin wires are formed on a substrate made of a transparent material such as glass, quartz, or plastic.

The polarizing element 330 includes a substrate main body 331 and a metal thin wire 332, and the polarizing element 340 includes a substrate main body 341 and a metal thin wire 342. In the embodiment, the substrate main bodies 331 and 341 correspond to the substrate of each of the polarizing elements and also correspond to a substrate of the liquid crystal device. In addition, the metal thin wire 332 and the metal thin wire 342 intersect with each other. In each of the polarizing elements 330 and 340, the metal thin wires are arranged on an inner surface side of the element (a side of the each element facing the liquid crystal layer 350).

On the inner surface side of the polarizing element 330 are provided a protection layer 313 of the polarizing element 330, a pixel electrode 314, a not-shown wire, and a TFT element, along with an alignment film 316. Similarly, on the inner surface side of the polarizing element 340 are provided a protection layer 323 of the polarizing element 340, a common electrode 324, and an alignment film 326.

In the liquid crystal device thus formed, the substrate main bodies 331 and 341 serve as the substrate for the liquid crystal device and the substrate for the polarizing element, so that a total number of components can be reduced. Thereby, the liquid crystal device as a whole can be made thinner and thus a function of the liquid crystal device 300 can be improved. Furthermore, since the device structure is simplified, the production of the liquid crystal device can be facilitated and cost reduction can be promoted.

Electronic Apparatus

Figure 7:
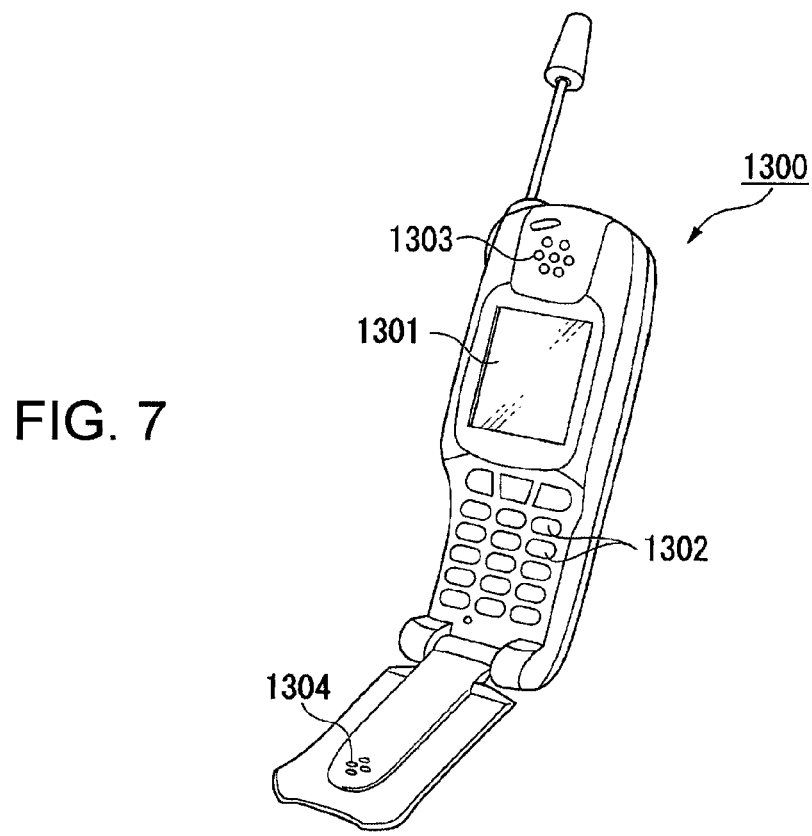
FIG. 7 is a perspective view of a mobile phone as an electronic apparatus according to another embodiment of the invention.

Next, a description will be given of an electronic apparatus according to another embodiment of the invention. FIG. 7 is a perspective view showing an example of the electronic apparatus including the liquid crystal device of FIG. 6. A mobile phone (an electronic apparatus) 1300 shown in FIG. 7 includes the liquid crystal device of the embodiment as a small display section 1301, a plurality of operation buttons 1302, an earpiece 1303, and a mouthpiece 1304. Thereby, the mobile phone 1300 can be highly reliable and can obtain a display section allowing high-quality display.

Furthermore, besides the above mobile phone, the liquid crystal device of the embodiment can be suitably used as an image displaying unit for an electronic book, a personal computer, a digital still camera, a liquid crystal television, a view finder type or direct view type video tape recorder, a car navigation device, a pager, an electronic organizer, an electronic calculator, a word processor, a work station, a TV phone, a point-of-sale (POS) terminal, an apparatus with a touch panel, or the like.

While some preferred embodiments of the invention have been described with reference to the accompanying drawings, it is obvious that the invention is not restricted to the embodiments. The shapes of the constituent members and the combination of the members shown in the embodiments are merely examples, and various modifications and changes can be made based on design requirements or the like without departing from the scope of the invention.

What is claimed is:

1. A polarizing element, comprising:
    a substrate;
    a plurality of protruded threads formed on one of surfaces of the substrate in a rough stripe pattern when viewed two-dimensionally, each of the protruded threads having a side surface forming a slope inclined with respect to the one surface of the substrate; and
    a plurality of metal thin wires each formed on the slope of the each protruded thread so as to be cantilever-supported by the slope and each extended in an extension direction of the protruded thread.

2. The polarizing element according to claim 1, wherein an upper end surface of the protruded thread is roughly flat, and the each metal thin wire is protruded from the slope toward the upper end surface of the protruded thread in a manner so as to cover at least a part of the upper end surface when viewed two-dimensionally.

3. The polarizing element according to claim 1, wherein the metal thin wires are made of a metal selected among silicon, germanium, and molybdenum.

4. A method for producing a polarizing element that includes a plurality of protruded threads formed on one of surfaces of a substrate in a rough stripe pattern when viewed two-dimensionally and a mask formed on an upper portion of each of the protruded threads, the method comprising:
    forming a plurality of metal thin wires each extended along the each protruded thread, each of the metal thin wires being made of a metal material deposited both on one of side surfaces of the protruded thread and on one side surface of the mask adjacent to the one side surface of the protruded thread; and
    removing the mask.

5. The method for producing a polarizing element according to claim 4, wherein the one side surface of the mask is a slope that covers at least a part of the upper portion of the each protruded thread when viewed two-dimensionally.

6. The method for producing a polarizing element according to claim 4, wherein, before the metal thin wire formation step, the protruded thread formation step forms a resist having a predetermined pattern on one of surfaces of a base member forming the substrate and etches the base member via the resist to obtain the substrate having the protruded threads formed in the predetermined pattern, and the mask formation step forms the mask by using a part of the resist left on the upper portion of each of the protruded threads.

7. A projection display, comprising:
    an illumination optical system that outputs light;
    a liquid crystal light valve that modulates the light;
    the polarizing element of claim 1 that receives the light modulated by the liquid crystal light valve; and
    a projection optical system that projects polarized light transmitted through the polarizing element on a projected surface.

8. A liquid crystal device including a pair of substrates, a liquid crystal layer provided between the substrates, and the polarizing element of claim 1 formed on a surface of at least one of the substrates, the surface facing the liquid crystal layer.

9. An electronic apparatus including the liquid crystal device of claim 8.

\* \* \* \* \*